United States Patent [19]

Lipowski

[11] Patent Number: 4,650,380
[45] Date of Patent: Mar. 17, 1987

[54] WIRE SHAVING APPARATUS

[75] Inventor: Edwin M Lipowski, Westlake, Ohio

[73] Assignee: Kalt Manufacturing Company, North Ridgeville, Ohio

[21] Appl. No.: 758,108

[22] Filed: Jul. 23, 1985

[51] Int. Cl.⁴ .............................................. B23D 1/20
[52] U.S. Cl. ..................................... 409/310; 72/275;
 409/289; 409/345; 409/347
[58] Field of Search ............... 409/308, 310, 312, 325,
 409/339, 340, 342, 338, 345, 346, 289, 311, 347;
 407/101, 106, 111; 83/914; 408/13, 24, 12;
 72/275, 21, 22, 25, 27, 276; 29/337

[56] References Cited

U.S. PATENT DOCUMENTS

| | | | |
|---|---|---|---|
| 1,163,062 | 12/1915 | Belz et al. | 72/275 |
| 2,120,316 | 6/1938 | Stone | 83/914 X |
| 2,638,818 | 5/1953 | Stevens | 409/310 X |
| 2,703,512 | 3/1955 | Brookes et al. | 409/345 X |
| 2,862,285 | 12/1958 | Miller | 407/111 |
| 3,018,700 | 1/1962 | Cerwin et al. | 409/310 |
| 3,336,839 | 8/1967 | Welter | 409/347 X |
| 4,061,064 | 12/1977 | Kindgren et al. | 408/13 X |
| 4,092,875 | 6/1978 | Uhlmann et al. | 72/275 |
| 4,162,642 | 7/1979 | Greven | 72/275 X |
| 4,352,309 | 10/1982 | Thalstrom et al. | 83/914 X |

Primary Examiner—Gil Weidenfeld
Assistant Examiner—Glenn L. Webb
Attorney, Agent, or Firm—Watts, Hoffmann, Fisher & Heinke Co.

[57] ABSTRACT

A wire shaving apparatus for shaving a periphery of wire, bar or rod stock, including structure defining a product flow path between an input and an output and a plurality of shaving stations spaced along said flow path for scrapingly engaging product conveyed through said structure. Each shaving station includes a pair of slide mechanisms, one slide mounting a releasable tool cartridge including a pair of cutting tools having associated cutting edges positioned at a predetermined angle, and another slide assembly mounting a product support cartridge including support rollers aligned with said cutting tools for supporting said product as it is being scraped. The slides are reciprocally moved between processing and retracted positions by a threaded drive shaft, the rotation of which is controlled by a servo controlled system. A clamping arrangement associated with each slide mechanism releasably clamps the tool and support cartridges allowing easy and speedy replacement. A guide assembly guides the product as it leaves the structure and includes a fluid pressure operated actuator for driving a pair of pinch rollers towards and away from the product flow path whereby a variety of rod stock diameters are accommodated.

27 Claims, 22 Drawing Figures

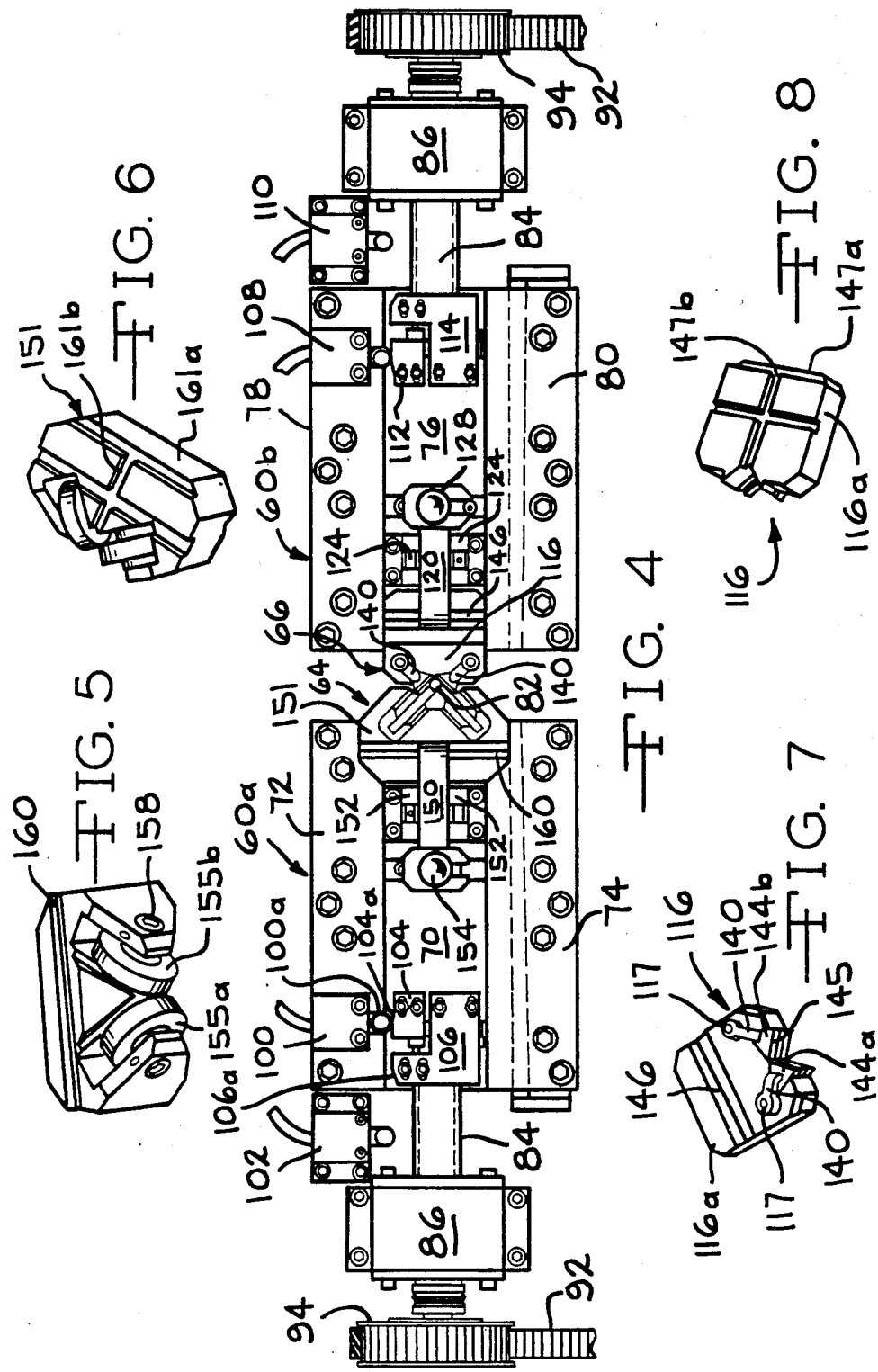

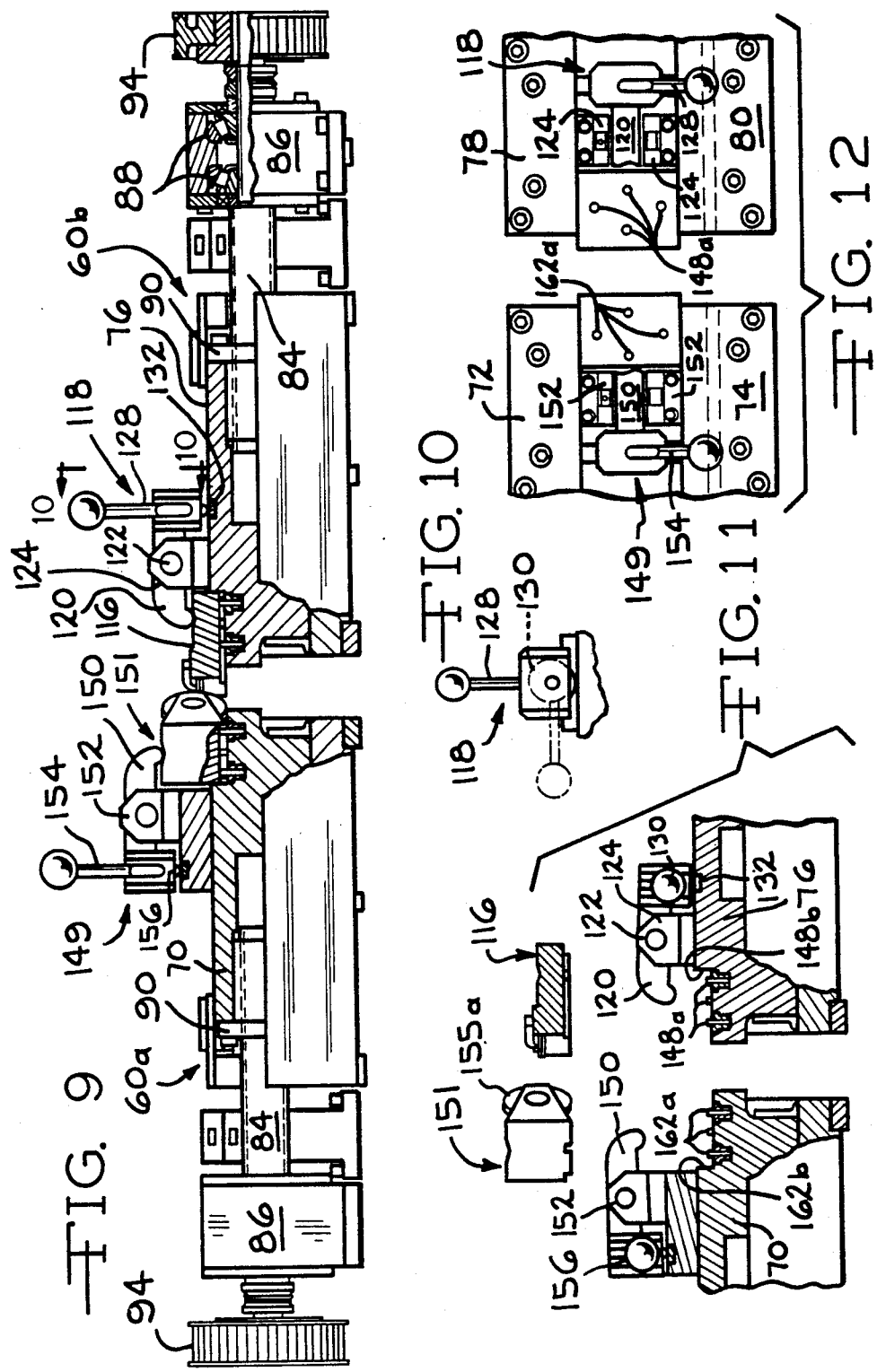

WIRE SHAVING APPARATUS

TECHNICAL FIELD

The present invention relates generally to metal working and in particular to an apparatus and method for surface finishing bar, rod or wire stock.

BACKGROUND ART

Wire and rod stock often requires surface finishing after manufacture. Examples of post-manufacture finishing include pickling to remove corrosion and scale and drawing operations to reduce the diameter of the wire to "true up" the wire dimension and improve surface finish. Pickling operations do not necessarily impart a smooth or uniform surface finish to the treated wire. Drawing operations oftentimes do not eliminate deep surface irregularities since drawing operations only mask the defects.

Apparatus for scraping the surface of the wire to remove surface irregularities has been suggested in the past. In particular, U.S. Pat. No. 2,703,512 disclosed a wire shaving apparatus in which a plurality of stations, each station including a scraping tool and support roller, was used to scrape the face of wire stock as it was pulled through the apparatus. It is believed that the disclosed apparatus was difficult to use and tool changes to replace broken tools or to change wire size, were burdensome. As a result, it is believed that the disclosed apparatus was not commercially successful.

DISCLOSURE OF INVENTION

The present invention provides a new and improved apparatus and method for shaving or scraping the surface of rod, bar or wire stock or similar metal products. Utilizing the disclosed method and apparatus, wire product can be continuously processed at relatively high speed to remove surface irregularities and to provide a uniform surface finish to the product.

According to the invention, the apparatus comprises structure defining a processing flow path through which the metal product is conveyed. A plurality of scraping or shaving stations are spaced along the processing path, each station being operative to scrape a portion of the surface of the metal product as it is conveyed through the station.

Each station includes at least one cutting tool and at least one associated product support element for supporting the product as it is scraped by the cutting tool. In the preferred embodiment, the support element comprises at least one roller spaced from but aligned with the cutting tool. According to the invention, the cutting blade and preferably the support roller are reciprocally movable between processing positions and spaced or rest positions. In the processing position, the cutting blade engages and shaves the surface of the wire product. The quantity of material removed is determined by the spacing between the support roller and the blade. In the rest position, both the roller and cutting blade are moved to a position out of contact with the product.

According to a feature of the invention, both the cutting tool and associated support roller are each mounted to an associated, reciprocally movable slide. Preferably, the slide defines a path of movement towards and away from the process flow path, the angle of movement being substantially orthogonal to the direction of product movement. According to this aspect of the invention, the displacement of the slide is monitored by a closed loop feedback system so that the positions of the tool and support roller can be accurately determined and controlled. A suitable control system coordinates the movement of both the support roller and the cutting tool slides so that a predetermined spacing between the roller and cutting tool can be set and maintained. As indicated above, the gap between the cutting tool and support roller determine the amount of material shaved from the product as it is conveyed past the shaving station.

According to the preferred method, prior to commencement of the shaving operation, the cutting tools and associated backup rollers are withdrawn to their rest positions, i.e., out of contact with the product flow path. The product to be processed is then threaded through the shaving stations and connected to a device for pulling the product. Movement of the product is then commenced through the stations and while moving, the slides supporting the cutting tools and support rollers are driven towards the process flow path and into contact with the product, whereupon the scraping operation begins. When the operation is complete, or should interruption of the process be desired, the slides are retracted in order to withdraw the support rollers and scraping blades from the processing path.

In the preferred and illustrated embodiment, the support roller and cutting tool slides are reciprocally driven by rotatable, threaded shafts. As the shafts are rotated, the threaded engagement between the slides and the shafts cause the slides to reciprocate along the shaft in a direction dependent on the direction of rotation. To achieve a closed loop feedback control, the shafts are driven by a servomotor, the rotation of which is monitored by a feedback system that translates rotation of the servomotor to displacement of the slide along the rotating drive shaft. With the disclosed arrangement, extremely accurate positioning of the slides can be achieved.

According to the preferred method of operation, prior to commencing a scraping operation, the system is calibrated by driving each slide to a predetermined position at which a sensor, such as a limit switch, is actuated to establish a reference or "null" position. Once the reference position is reached, the control system can generate precise positioning signals for the servo control system to move the slide relative to the reference position.

According to a feature of the invention, the cutting tools and backup rollers are easily changed. It has been found that although a given set of cutting tools and associated support rollers can accommodate a wide variety of wire diameters, the width of the support rollers must be adjusted or reduced for very small diameters. Consequently, for certain wire sizes, the tooling must be changed. In accordance with the invention, the support rollers and cutting tools are mounted in cartridge like devices that are clamped in holders forming part of the slide mechanisms. Levers, operating eccentric cams, forming part of the tool holders, are manipulated to clamp the cartridges in place. Each cartridge includes guideways which cooperate with locating elements forming part of the tool holders to precisely locate the cartridges within the holders. It has been found that tool changes can be effected very rapidly and machine down time is then minimized when tools are changed.

In the preferred tool cartridge arrangement, each cartridge mounts two cutting tools so that a given cartridge scrapes two surfaces on the wire. With the preferred arrangement, each support roller cartridge rotatably supports a pair of support rollers associated with the cutting tools.

Additional features of the invention will become apparent and a fuller understanding obtained by reading the following detailed description made in connection with the accompanying drawings.

BRIEF DESCRIPTION OF DRAWINGS

FIG. 4 is a fragmentary view of a slide mechanism forming part of the machine shown in FIG. 2;

FIGS. 5-8 are perspective views of tool and roller cartridges which are mounted to the slide mechanism shown in FIG. 4;

FIG. 9 is a side elevational view shown, partly in section, of the slide mechanism shown in FIG. 4;

FIG. 10 is a side view as seen from the plane indicated by the lines 10—10 in FIG. 9;

FIG. 11 is a fragmentary, partly in section, view of cartridge holders constructed in accordance with the preferred embodiment of the invention;

FIG. 12 is plan view of the cartridge holders shown in FIG. 11;

BEST MODE FOR CARRYING OUT THE INVENTION

Figure 1:
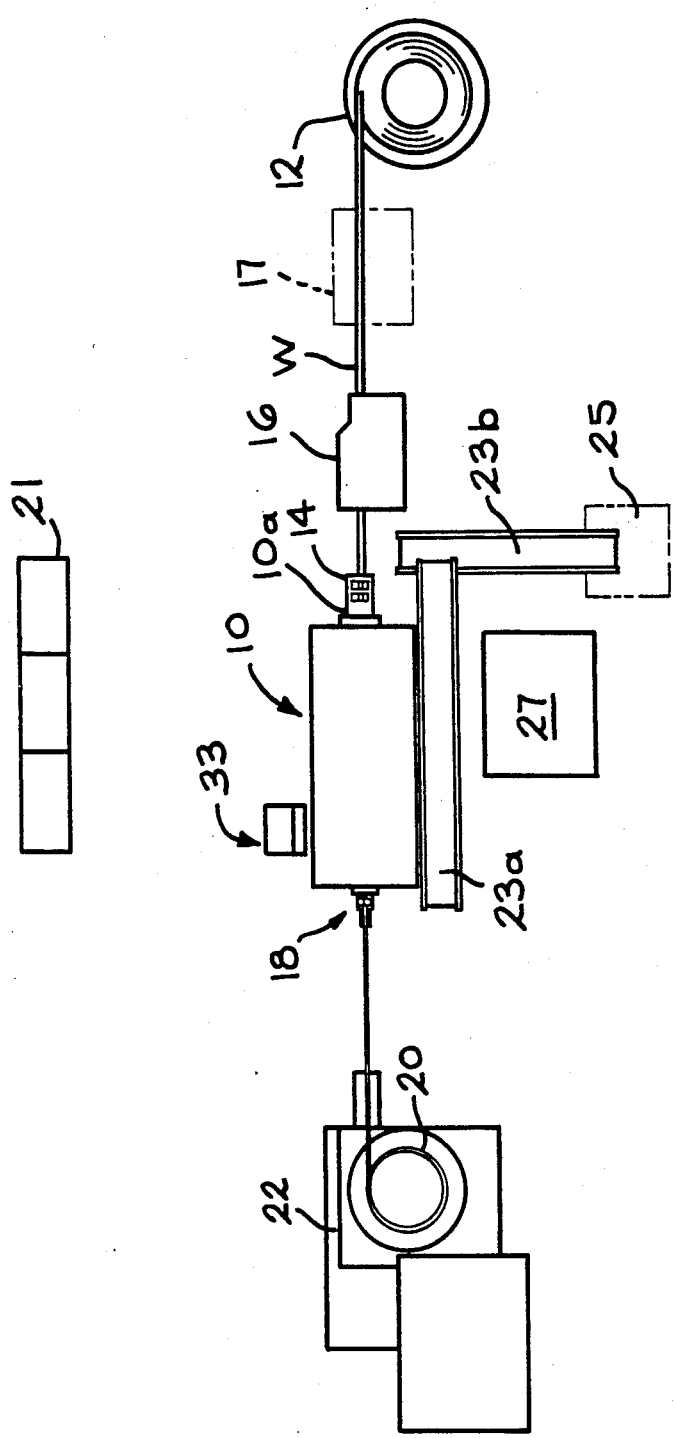
FIG. 1 is a plan view of a shaving apparatus embodying the present invention shown in connection with peripheral processing equipment.

FIG. 1 illustrates a wire shaving or scraping system including a shaving machine 10 constructed in accordance with the preferred embodiment of the invention. Wire or rod stock W is fed from a payout reel 12 to an input end 10a of the shaving machine 10. The input end 10a may include a draw die 14 for slightly reducing the diameter of the rod in order to "true up" the rod and improve its concentricity. Peripheral equipment may be disposed between the input 10a and the reel 12, such as a conventional wire straightener 16 and/or a welder 17 for attaching the end of the rod W to a leader to facilitate the initial "threading" of the shaving machine. The processed rod W exits the shaving machine 10 through an exit guide 18. From there, the rod is wound onto a takeup reel 20 which may form part of a conventional "bull block" 22. In the preferred embodiment, the bull block 22 serves as the driving force for pulling the rod W through the shaving machine 10.

The shaving system also includes a control module 21 which houses the controls and circuitry for controlling the operation of the shaver 10 as well as the bull block and the other peripheral equipment. Chip conveyors 23a, 23b are positioned adjacent the shaving machine 10 and transport chips to a remote chip disposal unit or container 25. The shaving system also includes a coolant tank 27 and associated pumping and conduit system.

Figure 2:
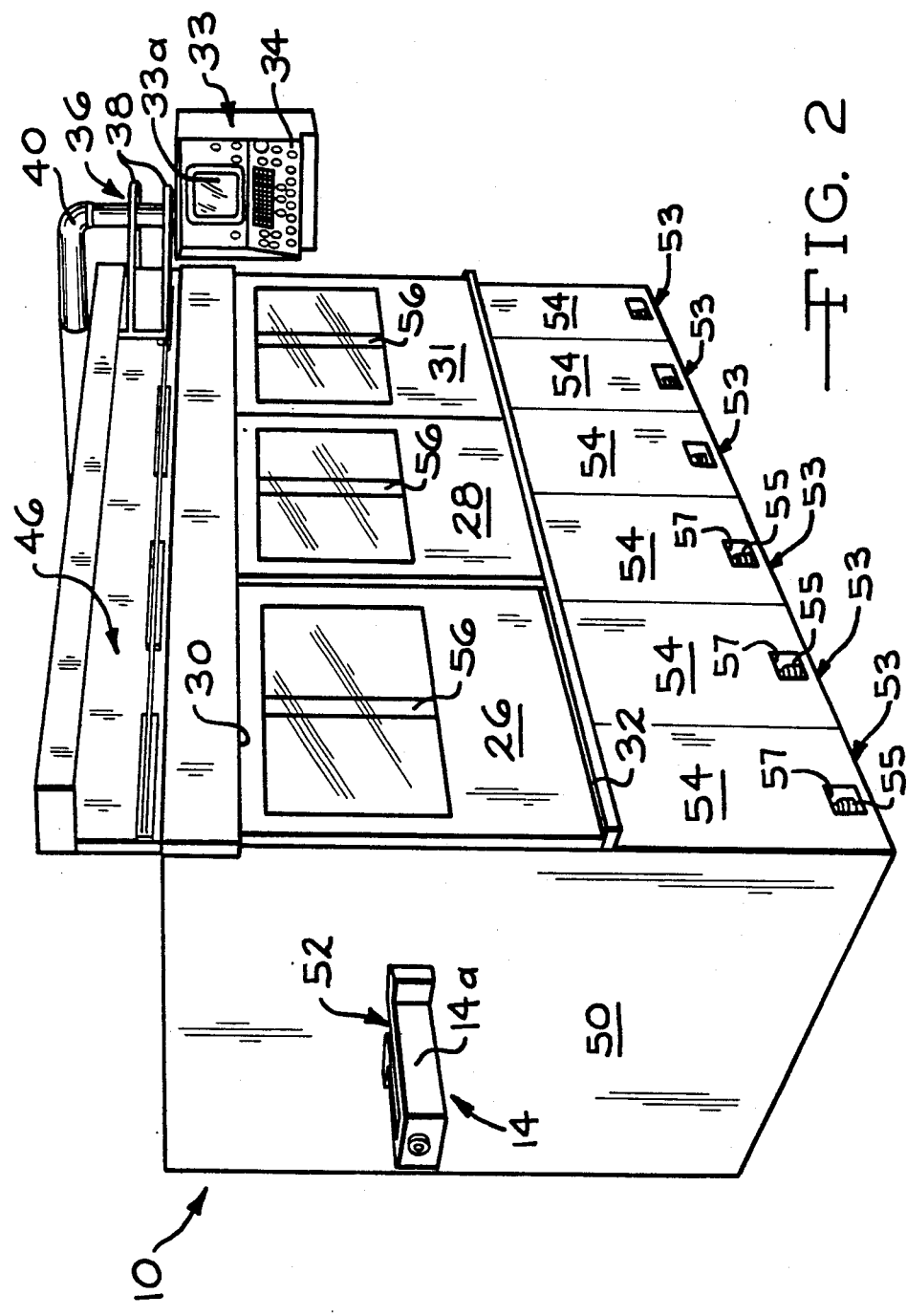
FIG. 2 is a perspective view of the shaving machine.

Referring also to FIG. 2, the shaving apparatus 10 is a rectangular structure comprising a plurality of heavy metal plates which form a rigid frame. Access doors 26, 28 and 31 guided for sliding movement by trackways 30, 32 provide access to the interior of the machine, but are closed, (as shown in FIG. 2) when product is being processed so that the shavings, chips and other materials removed from the rod W, are contained within the machine. A machine controller 33, housing a CRT screen 33a and associated control panel 34 is pivotally mounted to a support 36 defined in part by a pair of laterally extending arms 38. A conduit 40 encloses and protects wiring that interconnects the controller 33 with the control module 21, shown in FIG. 1. The CRT support 36 is mounted in a trackway 46 to enable the controller 33 to be positioned anywhere along the front of the shaving apparatus. The overall control of the machine and process may be achieved by a programmable industrial computer such as a Model PIC 409 available from Giddings and Lewis Electronics Co. which is located in the control module 21.

As seen best in FIG. 2, the draw die 14 is mounted at one end of the machine, and in particular is mounted to a side plate 50. A replaceable die 52 is suitably held by a draw die housing 14a.

As seen in FIG. 2, the machine 10 is made up of six similar sections, each section designated by the reference character 53. The sections 53 are joined in a side-by-side fashion to form a rigid, unitary structure. A cross plate 54 extends across the front of each machine section 53, just below the doors 26, 28, 30. A plurality of leveling studs 55 are provided in apertures 57 formed in each cross plate 54, to enable precise leveling of the machine 10.

Figure 3:
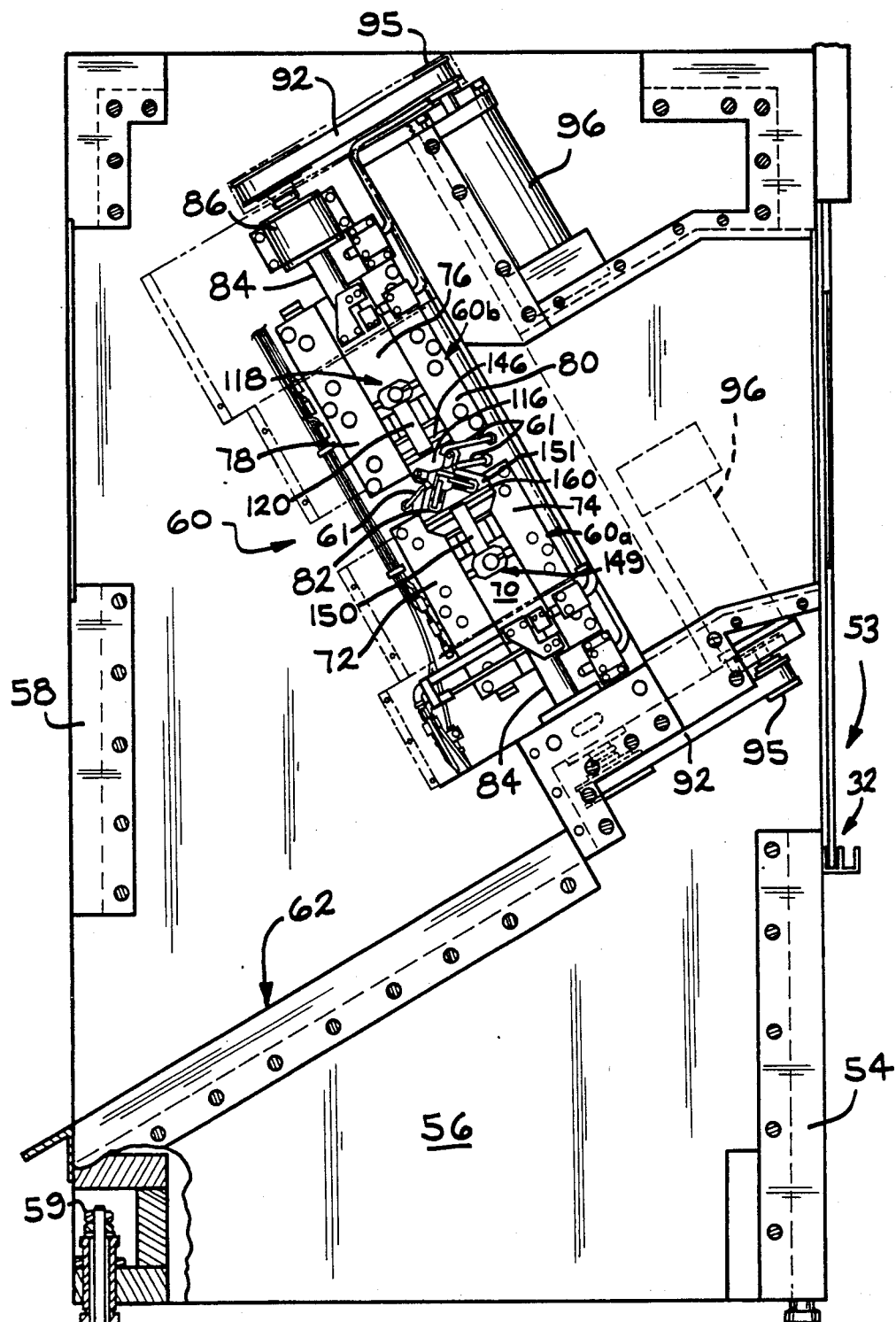
FIG. 3 is a sectional view as seen in the plane indicated by the lines 3—3 in FIG. 1.

Turning now to FIG. 3, a vertically standing plate, one of which is designated by the reference character 56 in FIG. 3, form part of each machine section 53. Each vertical support plate 56 defines a scraping station and mounts a slide assembly, indicated generally by the reference character 60, which in turn reciprocally mounts scraping tools for scraping the product as it is conveyed through the scraping station and support members for supporting the product as it is being scraped. A rear cross plate 58 extends along the rear of each machine section 53. The vertical plates 56 extend between and are fastened to the rear and front cross plates 58, 54 of each section 53. A plurality of leveling studs 59 are mounted along the lower rear edge of the machine. An inclined, lateral plate 62 extends between each vertical support plate 56 and defines a chute for funneling the scrapings and chips to a chip conveyor 23a (shown only in FIG. 1). A plurality of nozzles 61 are mounted at each shaving station and direct coolant at the cutting tools during machine operation.

Referring also to FIG. 4, the slide assembly 60 includes two individual slide subassemblies 60a, 60b. For purposes of explanation, the slide 60a mounts the support member, indicated generally by the reference character 64, for supporting the product as it is conveyed through the shaving station. The slide 60b mounts a cutting tool 66. The slide subassembly 60a includes a reciprocal slide 70 slidably supported between track members 72, 74. Similarly, the slide subassembly 60b includes a slide 76 reciprocally mounted in a trackway defined by track members 78, 80. As seen in FIG. 4, the slides 70, 76 are mounted in axial alignment and are movable towards and away from each other along their respective trackways. The rod W (shown in FIG. 1) travels between the inner ends of the slides 70, 76 along a product flow path, the centerline of which is indicated by the reference character 82.

The cutting tool slide 76 is driven towards and away from the centerline 82 by a threaded drive shaft 84. Because movement in the slide 76 must be precisely controlled, the shaft 84 carries a "ball screw" known in the industry. The right end of the shaft 84 is rotatably supported in a bearing housing 86 which, as seen in FIG. 9, mounts a tapered roller bearing 88. The slide 70 is supported and driven towards and away from the centerline 82 in a substantially identical fashion.

Each slide 70, 76 (as seen best in FIG. 9) includes a replaceable ball nut 90 which threadedly cooperates with the drive shaft 84. It should be understood that rotation of the shafts 84 produces lateral, reciprocating motion in the associated slides 70, 76 along their respective trackways.

Rotation of the drive shafts 84 is effected by a timing belt 92 that is reeved around an associated timing belt pulley 94. The timing belt pulleys 94 are mounted to the extreme outward ends of each shaft 84.

As seen in FIG. 3, each timing belt is connected to the output shaft 95 of a servo motor 96. The servo motor 96 may be conventional, and as is known in the industry, includes a feedback system by which rotation of its output shaft 95 is monitored. It should be understood that depending on the thread pitch of the drive shaft 84, rotation of the shaft by the servo motor will produce a predetermined lateral movement in the slide. Control circuitry which may include a computer processing unit precisely controls the position of a slide by calculating the number of drive shaft revolutions (or partial revolutions) that will produce a predetermined displacement in the associated slide.

The extremes of movement of each slide 70, 76 are monitored. Referring in particular to FIG. 4, limit switch assemblies 100, 102 monitor the position of the slide 70. An adjustable switch abutment 104, including a ramp surface 104a is mounted to the slide 70. As the slide 70 moves inwardly towards the product flow path 82, a switch arm 100a is eventually actuated by the ramp surface. A second switch abutment 106 including a ramp surface 106a actuates the switch 102 when the slide 70 moves to its outermost position, spaced from the product flow path. A similar set of switch assemblies 108, 110 actuated by adjustable switch abutments 112, 114, forming part of the slide subassembly 60b.

The switches monitor the movement of the associated slides and define the extremes of movement or "hardware limits" and in addition are used to establish null or reference positions for the slide positioning control system which may be termed "home limits" if the controller 33 is computer based. In the preferred construction, the switch assembly 102 comprises two, piggy-backed switches (only one is shown). One of the switches established the outer hardware limit for the slide 70 whereas the other switch is used to establish the reference position for the controller. The switch assembly 110 is similarly constructed and performs the same function for the slide 76.

When the shaving apparatus is initially powered up, the slides 70, 76 are driven outwardly, away from the product flow path, until the outer limit switches 102, 110 are actuated. The associated abutments are adjusted so that the switches 102, 110 are tripped at predetermined outward positions of their associated slides 70, 76, respectively. The servo control system can then precisely position the slides 70, 76 by using the limit switch actuation as a reference point to calculate the number of rotations of the drive shaft 84 that will position the associated slides at a given distance from the product flow path 82. The inner limit switches 100, 108 prevent the slides from being overly extended.

Referring now to FIGS. 4–10 the details of the product support member 64 and the tool holder 66 are illustrated. In the preferred embodiment, the support member 64 and the tool holder 66 are configured as easily replaceable cartridges.

Each slide includes a clamping arrangement best shown in FIG. 9. The slide 76 which mounts a tool cartridge 116 includes a clamping arrangement 118. The clamping arrangement includes a pivotally mounted arm 120 including trunnions 122 supported by a yoke 124. As seen in FIG. 10, a rotatable release handle 128 connected to an eccentric cam 130, is mounted at one end of the clamping arm 120 and is coactable with a camming surface 132 which in the illustrated embodiment comprises a replaceable or hardened insert. As seen best in FIG. 10, when the handle 128 is rotated from the horizontal to the vertical position, the eccentric cam 130 contacts the cam surface 132 raising that end of the clamping arm 120 causing the opposite end of the arm to clamp down on the tool cartridge 116.

Referring to FIGS. 7 and 8, the tool cartridge 116 comprises a rigid block 116a of material such as steel which includes a pair of clamps 140 that removably mount a pair of tool inserts 144a, 144b. The clamps 140 are held by suitable fasteners 117 such as socket head bolts. As is known in the art, the inserts each include a cutting edge 145 which contacts and scrapes the product as it travels through the shaving station. An outer surface of the tool cartridge defines a recess or slot 146 which is engaged by the clamping arm 120. An underside of the cartridge defines a precision groove 147b and ground surface 147a which coact with locating pins 148a and ground surface 148b (see FIG. 12) that precisely locate the cartridge at the end of the slide 76. With this construction, the tool cartridge 116 is precisely positioned by the pins and maintained in this position by the clamping arrangement 118.

The slide 70 includes a similar clamping arrangement 149 for clamping the product support element which is preferably formed as a replaceable cartridge 151. In particular the clamp includes a clamping arm 150 supported by a yoke 152, an operating handle 154 and an associated eccentric cam 156 mounted at one end of the clamping arm 150 for moving the arm towards and away from the product support cartridge 151 to effect rigid clamping. As seen in FIGS. 5 and 6, the support cartridge 151 mounts a pair of support rollers 155a, 155b arranged at a predetermined angle. In the preferred embodiment, the rollers 155a, 155b are rotatably supported by precision bearings 158. An upperside of the cartridge 151 includes a longitudinal groove or slot 160 which is engageable by the clamping arm 150. An underside includes precision grooves 161b and ground surface 161a which coact with locating pins 162a and ground surface 162b (see FIG. 12) for precisely locating the support cartridge 151 on the slide 70.

Figure 13:
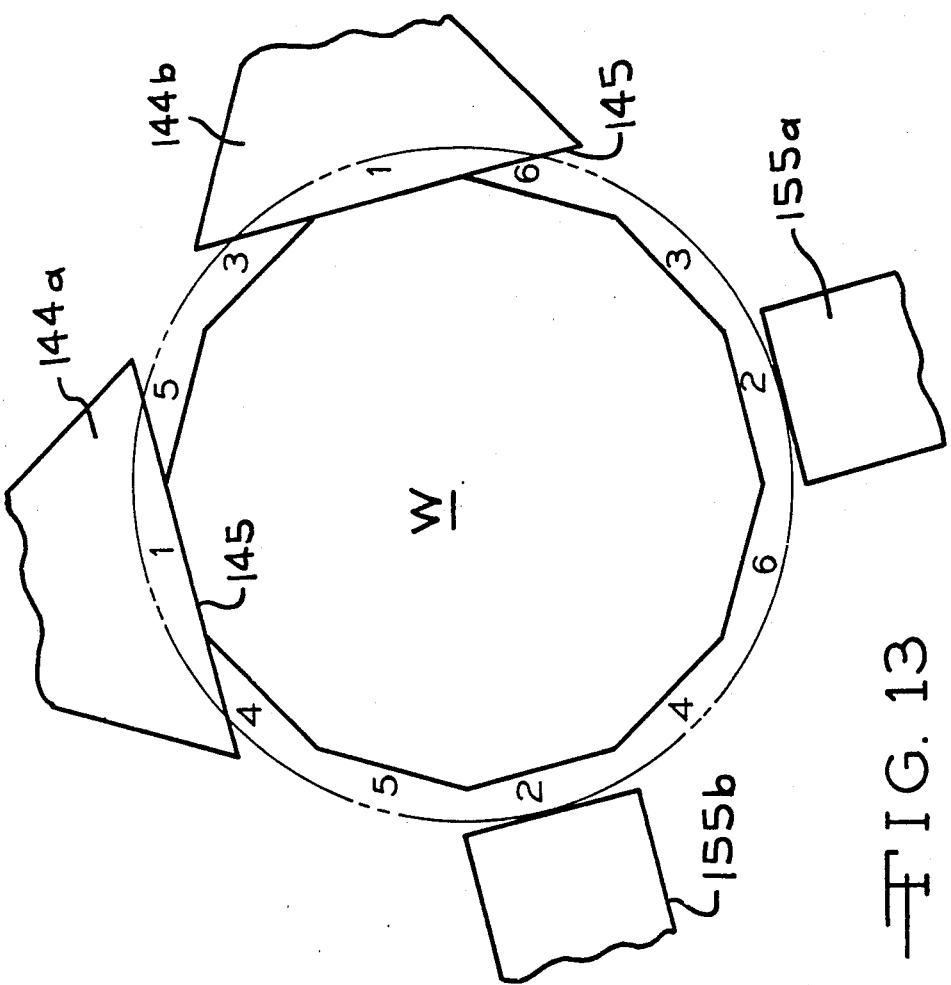
FIG. 13 is a diagrammatic view of the shaving sequence.

The position of the rollers 155a, 155b in the support cartridge 151 and the positioning of the cutting tools 144a, 144b in the tool cartridge 116 are arranged such that when the cartridges 116, 151 are mounted in the shaving station, the rollers 155a, 155b are aligned with the cutting tools 144a, 144b respectively. The rollers, in particular, are positioned diametrically opposite the cutting tools so that the product is rigidly supported as it is shaved by a given tool. The relationship between the support rollers 155a, 155b and the cutting tools 144a, 144b is best seen in FIG. 13.

In the illustrated embodiment, 12 facets or faces are shaved from the rod stock W. FIG. 13 illustrates the scraping operation that occurs at station 1. At this station, the cutting tools 144a, 144b shave flats labels "1" from the bar stock. During the scraping operation, the associated support rollers 155a, 155b contact the periphery of the bar stock to support the stock as it passes the cutting tools 144a, 144b. The support rollers 155a, 155b prevent deflection in the stock that, if not controlled, would cause less than a desired amount of material to be removed.

It should be noted that although at station 1, the support rollers 155a, 155b contact the uncut periphery of the bar stock, at subsequent stations, the support rollers may roll against flats cut in the bar stock at previous stations. For example, the faces cut in the bar stock at station 2 are indicated by the numeral "2". It should be apparent that with the cutting tools 144a, 144b located at the locations indicated by the number "2", their associated support rollers will ride against the flats cut by the cutting tools in prior shaving station i.e., at the location indicated by the numeral "1". Thus at station 2, the support rollers associated with the cutting tools will ride against flats. At station 3, however, the support rollers will again ride against the uncut periphery of the bar stock, whereas at station 4, the support rollers will ride against the faces designated by the numeral "3" which are cut at station 3.

As a result, the spacing between the tool cartridge 116 and support cartridge 151 will vary from station to station depending on whether the rollers 155a, 155b are riding against cut surfaces or the uncut periphery. In order to provide the proper spacing between the tools at the various stations, a control system, preferably computer based, is used to calculate reference signals for the servo motors 96 associated with each slide so that the drive shafts 84 are precisely rotated to position the slides at desired positions. By using a computer based control system, known algorithms can be employed to calculate the proper reference signals for the servo control system for a wide variety of bar stock diameters.

With the disclosed machine construction, bar stock sizes can be easily changed. In fact using known computer based controllers, an operator can merely input a requisite number of parameters such as the desired finished diameter and the controller will cause the slides to move to the proper positions. Additionally, the novel cartridge mounting system enables the support and tool cartridges to be easily replaced and in fact, it is believed that all the tools and support cartridges can be replaced by knowledgeable operators, at all six stations in approximately two minutes.

An alternate scraping tool configuration and method is illustrated. In the scraping method shown in FIG. 13, each of the cutting tools 144a, 144b includes a substantially rectilinear cutting edge 145. The cutting edges define an included angle of about 90°. As a result and as shown in the Figure, the rod W, after passing through the six cutting stations, is defined by a twelve sided periphery. If the final product must be round, the rod W must then be further processed to remove the twelve flat faces. This may be accomplished by a drawing operation or other suitable method. It should be realized, that in order to remove a minimum thickness of material from all regions of the rod, excessive material may be removed from the rod at the intermediate regions between the junctures of adjacent flats.

Figure 14:
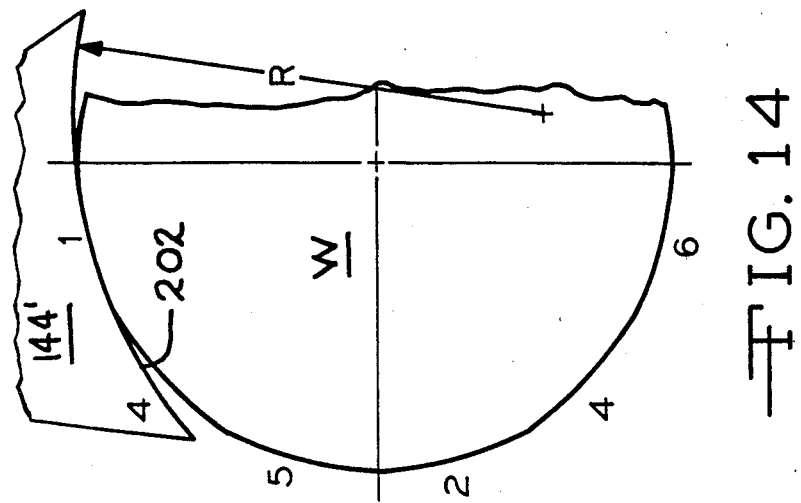
FIG. 14 is another diagrammatic view of a shaving sequence.

In the cutting arrangement shown in FIG. 14, the amount of material removed from the rod W is reduced without sacrificing the quality of the resulting surface finish. It is accomplished using an alternate cutting tools, indicated by the reference character 144', which unlike the cutting tools 144a, 144b shown in FIG. 13, each include a radiused cutting edge 202. The radius of the cutting edge as indicated by the arrow label "R" is greater than or equal to the nominal radius of the bar being scraped. With the disclosed cutting tool, the finished surface of the bar comprises twelve arcuate surfaces which more closely approximates a circular cross section. With this cutting arrangement, the amount of material removed from the product is substantially reduced and may be eliminated or reduced.

Figure 15:
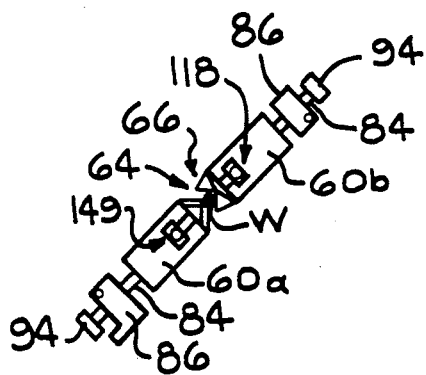
FIGS. 15-20 schematically illustrate the sequence of shaving operations.
Figure 16:
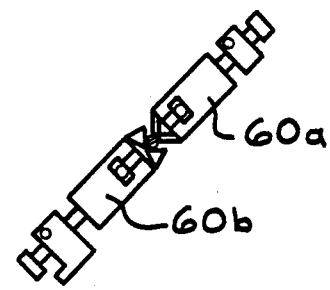
Figure 17:
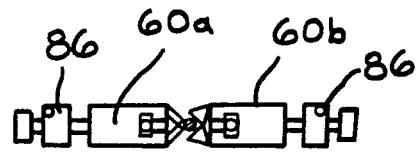
Figure 18:
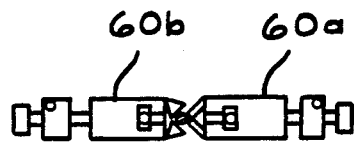
Figure 19:
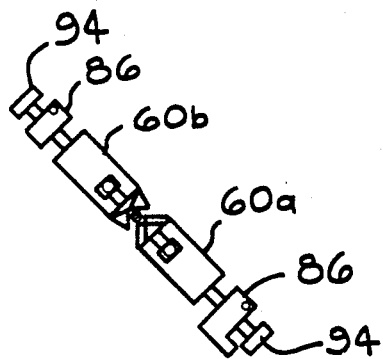
Figure 20:
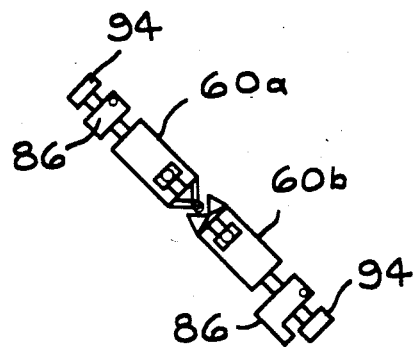

Referring to FIGS. 15-20, the overall shaving process is schematically illustrated. FIG. 15 illustrates the shaving process carried out at station 1. The location of the shaved regions on the rod W correspond to the regions labeled "1" in FIG. 13. FIG. 16 illustrates the orientation of the tool and support slides at station 2. The locations scraped by the tools are indicated in FIG. 13 by the numerals "2". FIGS. 17-20 illustrate the slide orientation for the tool and support slides as stations 3-6, respectively. It should be understood that these are shown by way of example, and other orientations of the slides could be used.

Figures 21, 22:
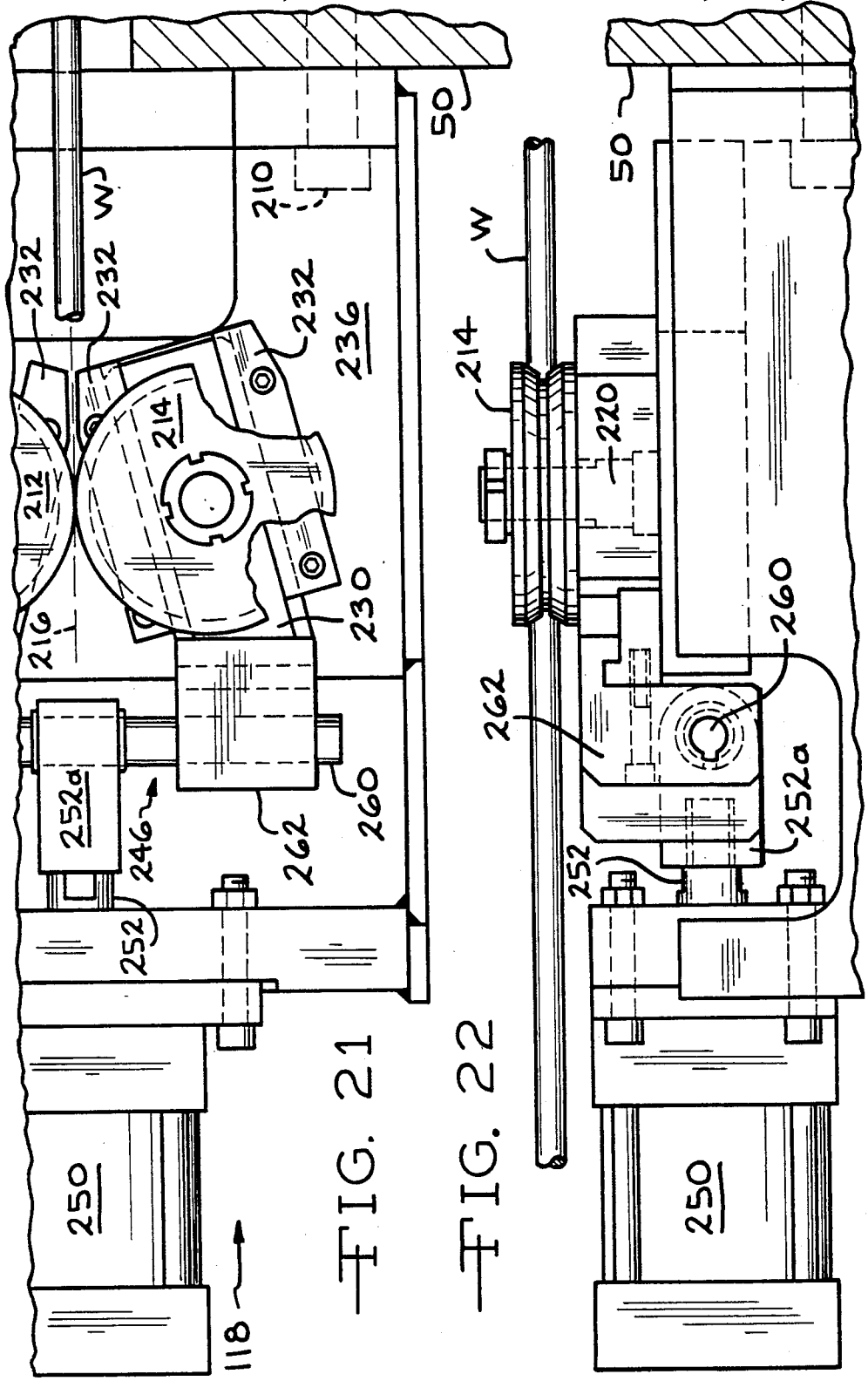
FIG. 21 is a plan view of a guide mechanism forming part of the shaving apparatus; and, FIG. 22 is a side view of the apparatus shown in FIG. 21.

The details of the exit guide 18 (see FIG. 1) for controlling the movement of the rod stock as it leaves the shaving apparatus, is shown in more detail in FIGS. 21 and 22. The exit guide 18 is bolted to an exterior side plate 50 of the shaving apparatus by a plurality of bolts, one of which is indicated by the reference character 210. The guide 18 mounts a pair of V-shaped, pinch rollers 212, 214, which are mounted on either side of a centerline 216 which coincides with the centerline of the product flow path 82 defined by the six cutting stations. As seen in FIG. 21, the finished rod W exits the machine and travels between the pinch rollers 212, 214.

According to a feature of the invention, the pinch rollers are movable towards and away from each other, along an angular path, with respect to the centerline. Movement of the pinch rollers is controlled such that the rollers are always equidistant from the centerline 216.

The apparatus for achieving this result comprises a spindle 220, rotatably mounting each pinch roller. The spindle forms part of a slide 230 which is mounted for reciprocating movement in trackways. Each trackway is defined by a pair of gibs 232 mounted to a base plate 236 forming part of the guide 18. The gibs define a path of movement for the spindle and hence the pinch roller, that includes vector components in both the axial direction (with respect to the rod W, and lateral direction, i.e., orthogonal to the centerline).

Coordinated movement in the pinch rollers 212, 214 is provided by a fluid pressure actuated slide assembly 246. An actuator 250, preferably a pneumatic operated type is bolted to the left end (as viewed in FIG. 21) of the guide assembly 18. The actuator 250 includes an actuating rod 252 reciprocally movable along a path substantially parallel and aligned with the product flow path 82. One end 252a of the actuator rod 252 mounts a slide rod 260 positioned orthogonally to the path of movement of the actuating rod 252. A pair of slide blocks (only one is shown in FIG. 21) 262 are slidably carried by the slide rod on either side of the actuating rod 252. The slide blocks 262 are connected to the slides 230 that carry the pinch roller spindles 220. When movement in the pinch rollers 212, 214 towards the centerline is desired, the actuator is energized to extend the actuating rod 252 causing the slides 230 carrying the spindles 220 to move along the trackways. Since the trackways are angled toward the centerline 216, as the actuator rod 252 extends, the pinch rollers 212, 214 move towards each other, eventually clamping the rod W in the V-grooves of the pinch rollers.

In normal operation, the actuator is continually pressurized to maintain a force on the pinch rollers so that the center position of the rod W is maintained. With this construction, the alignment of the rod R as it exits the shaving machine is maintained and prevents side thrust on the end of the rod from effecting the shaving operation at the last shaving station. If the rod were allowed to leave the output end of the machine unconstrained, the shaving conducted at the last shaving station could be compromised. The use of the symmetrical slide arrangement allows the exit guide 18 to be used for a wide variety of bar stock diameters. The actuator automatically adjusts the pinch roller spacing for a wide range of diameters.

Although the invention has been described with a certain degree of particularity, it should be understood that those skilled in the art can make various changes to it without departing from the spirit or scope as hereinafter claimed.

I claim:

1. A wire shaving system for continuously processing bar stock, comprising:
   (a) structure having an input for receiving bar stock to be processed and an output for discharging processed bar stock, said structure defining a processing path between said input and said output;
   (b) a plurality of shaving stations spaced along said processing path, each station operative to shave a portion of the peripheral surface of said bar stock;
   (c) each station including:
      (i) a pair of slide mechanisms mounted for movement towards and away from each other;
      (ii) drive means associated with each of said slide mechanisms, each drive means operable to reciprocally move said associated slide mechanism between a retracted and a plurality of extended positions;
      (iii) control means for controlling each of said drive means to provide coordinated movement between said slides such that a predetermined spacing between said slides can be selected;
      (iv) one of said slides mounting at least one cutting blade, said cutting blade operative to scrapingly engage a surface portion of said bar stock when said one slide is in a scraping portion;
      (v) said other slide mounting a backup means for supporting said bar stock as it travels past said cutting blade;
   (d) said drive and control means operable to retract said slide mechanisms to a position at which said cutting blade and said backup means disengage said bar stock and further operable to concurrently extend said slide mechanisms to a selected spaced position at which said cutting blade and said backup means currently engage said bar stock.

2. The apparatus of claim 1 wherein said one slide mounts two cutting blades disposed at a predetermined angle, said blades operative to scrape two surface portions of said bar stock when said one slide is in said scraping position.

3. The apparatus of claim 2 wherein said other slide mounts a pair of support rollers, one of said support rollers aligned with one of said cutting blades and the other of said support rollers aligned with the other of said cutting blades.

4. The apparatus of claim 3 wherein said predetermined angle is substantially 90° and said apparatus further comprises six cutting stations for shaving twelve faces on said bar stock.

5. The apparatus of claim 1 wherein the drive means for each slide mechanism includes a threaded drive shaft operatively coupled to a servo motor.

6. The apparatus of claim 5 wherein each slide mechanism includes a replaceable, threaded sleeve engageable with said threaded drive shaft.

7. The apparatus of claim 2 wherein said cutting blades form part of a replaceable tool cartridge and one of said slide mechanisms includes a means for clamping said tool cartridge to said slide.

8. The apparatus of claim 7 further comprising a locating means forming part of said slide mechanism cooperable with locating structure on said tool cartridge for precisely locating said cartridge on said slide.

9. The apparatus of claim 2 wherein said backup means comprises a support cartridge rotatably mounting a pair of rollers alignable with said cutting blades including structure for precisely locating said support cartridge on said other slide.

10. The apparatus of claim 8 wherein said locating means comprises a plurality of pins and said locating structure on said cartridge comprises grooves engageable by said pins.

11. The apparatus of claim 8 wherein said clamping means comprises an arm pivotally mounted to said slide including one end engageable with said cartridge and an operating handle including an eccentric cam mounted at another end operable to move said one end towards and away from said cartridge.

12. The apparatus of claim 2 further comprising sensing means associated with each slide mechanism for establishing fully extended and fully retracted positions for each slide mechanism.

13. The apparatus of claim 12 wherein said sensing means includes means for establishing a reference position for each slide mechanism from which said slide is driven to a bar stock engaging position.

14. The apparatus of claim 2 wherein said cutting blades include rectilinear cutting edges engageable with said bar stock.

15. The apparatus of claim 2 wherein said cutting blades include radiused cutting edges engageable with said bar stock.

16. A shaving machine comprising:
   (a) structure defining a rigid frame including a plurality of vertical standing plates each mounting a shaving apparatus;
   (b) said structure defining an input end and an output end;

(c) a guide means mounted at said output end for supporting product exiting said structure;

(d) said cutting stations defining a product flow path aligned with said input and output ends of said structure;

(e) each cutting station comprising:

(i) a cutting tool assembly movable towards and away from said product flow path and a product support assembly movable towards and away from said product flow path;

(ii) drive means including associated drive motors for actuating said tool and product support assemblies including sensing means for monitoring and establishing a maximum retracted position and a miximum extended position for each assembly;

(iii) control means for controlling each drive means, said control means operative to coordinate the actuation of said assemblies such that a predetermined spacing between said tool assembly and said product support assembly can be automatically selected, said control means and drive means further operable to drive said assemblies concurrently such that a product to be scraped is substantially concurrently engaged by said tool and support assemblies as said assemblies arrive at their selected spacing;

(iv) means releasably mounting a cutting tool to said tool assembly;

(d) means for conveying said product along said product flow path.

17. The apparatus of claim 16 wherein said tool assembly includes a slide defining a rectilinear path of motion for a cutting tool between retracted and processing positions.

18. The apparatus of claim 16 wherein said means for conveying said product comprises a bull block.

19. The apparatus of claim 17 wherein said slide is reciprocally driven along a trackway by a rotatable drive shaft threadedly engageable with threaded structure on said slide.

20. The apparatus of claim 19 wherein said threaded drive shaft is rotatably coupled to a servo controlled means including means for converting rotations of said drive shaft into a predetermined displacement of said slide.

21. The apparatus of claim 17 wherein said slide includes a clamping means for releasably clamping a cartridge having at least one cutting tool fixed thereto.

22. The apparatus of claim 17 wherein said sensing means comprises at least two switches associated with said slide engageable with associated abutments carried by said slide.

23. The apparatus of claim 16 further including an operator control assembly movable along a track formed on one side of said structure.

24. The apparatus of claim 16 wherein said exit guide comprises:

(i) a pair of pinch rollers movable towards and away from each other;

(ii) each pinch roller carried by a slide movable along an associated trackway, said trackways located symmetrically about a centerline defined by said guide;

(iii) actuating means for concurrently driving said slides along their associated trackways to cause said pinch rollers to move towards or away from each other depending on the direction of actuation.

25. The apparatus of claim 24 wherein said actuator is pnuematically operated and is maintained under pneumatic pressure during operation so that a pinching engagement is maintained with product being guided from said structure.

26. The apparatus of claim 25 wherein said actuator mounts a slide rod at one end of an actuating rod, said slide rod slidably engaging blocks forming part of said pinch roller slides, said slide rod allowing said blocks to move axially along said slide rod as said slides are being driven.

27. A shaving machine comprising:

(a) structure defining a rigid frame including a plurality of vertical standing plates each mounting a shaving apparatus;

(b) said structure defining an input end and an output end;

(c) a guide means mounted at said output end for supporting product exiting said structure, said guide means comprising:

(i) a pair of freely rotatable pinch rollers movable towards and away from each other;

(ii) each pinch roller carried by a slide movable along an associated trackway, said trackways located symmetrically about a centerline defined by said guide, said centerline located substantially coincident with said flow path, said trackways extending in an oblique angle with respect to said centerline;

(iii) a fluid pressure operated actuator operatively connected to said slides and operable to concurrently drive said slides along their associated trackways to cause said pinch rollers to move towards or away from each other depending on the direction of actuation whereby said product is engaged by said pinch rollers as said product exits said structure and is thereby maintained along said product flow path;

(d) said cutting stations defining a product flow path aligned with said input and output ends of said structure;

(e) each cutting station comprising:

(i) a cutting tool assembly movable towards and away from said product flow path and a product support assembly movable towards and away from said product flow path;

(ii) means for actuating said tool and product support assemblies including sensing means for monitoring and establishing a maximum retracted position and a maximum extended position for each slide assembly.

(iii) means releasably mounting a cutting tool to said tool assembly;

(d) means for conveying said product along said product flow path.

* * * * *